United States Patent
Hsieh et al.

(10) Patent No.: US 12,209,985 B2
(45) Date of Patent: Jan. 28, 2025

(54) SENSOR DEVICE AND METHOD OF USING THE SAME

(71) Applicant: VisEra Technologies Company Limited, Hsin-Chu (TW)

(72) Inventors: Hsin-Yi Hsieh, Taoyuan (TW); Yi-Hua Chiu, Hsinchu (TW); Wei-Ko Wang, Taoyuan (TW); Chin-Chuan Hsieh, Hsin-Chu (TW)

(73) Assignee: VISERA TECHNOLOGIES COMPANY LIMITED, Hsin-Chu (TW)

( * ) Notice: Subject to any disclaimer, the term of this patent is extended or adjusted under 35 U.S.C. 154(b) by 1168 days.

(21) Appl. No.: 17/025,114

(22) Filed: Sep. 18, 2020

(65) Prior Publication Data
US 2022/0091065 A1    Mar. 24, 2022

(51) Int. Cl.
 *G01N 27/327* (2006.01)
 *B01L 3/00* (2006.01)
 *G01N 27/447* (2006.01)

(52) U.S. Cl.
 CPC .... *G01N 27/3276* (2013.01); *B01L 3/502715* (2013.01); *G01N 27/447* (2013.01); *B01L 2200/14* (2013.01)

(58) Field of Classification Search
 CPC .............. G01N 27/3276; G01N 27/447; B01L 2200/0668; B01L 2200/14;
(Continued)

(56) References Cited

U.S. PATENT DOCUMENTS

2001/0024805 A1   9/2001  Williams et al.
2002/0102578 A1   8/2002  Dickinson et al.
(Continued)

FOREIGN PATENT DOCUMENTS

CN    105181658 A    12/2015
CN    106053402 A    10/2016
(Continued)

OTHER PUBLICATIONS

Eiji Nakamachi et al; "Development of a biomicroelectromechanical system device for axonal extension evaluation by PC12D patterning using a dielectrophoresis method" J. Micro/Nanolith. MEMS MOEMS 14(2); Apr.-Jun. 2015; pp. 025004-1-025004-10.
(Continued)

*Primary Examiner* — Gurpreet Kaur
(74) *Attorney, Agent, or Firm* — MUNCY, GEISSLER, OLDS & LOWE, P.C.

(57) ABSTRACT

A sensor device is provided. The sensor device includes a first substrate, a second substrate, a flow channel and a first reaction group. The second substrate is disposed opposite the first substrate. The flow channel is disposed between the first substrate and the second substrate, and the flow channel includes a fluidic boundary. The first reaction group is disposed on the first substrate and includes a first reaction site, a second reaction site and a third reaction site. The first reaction site is closer to the fluidic boundary than the second reaction site, and a size of the first reaction site is greater than or equal to a size of the second reaction site. The second reaction site is closer to the fluidic boundary than the third reaction site, and the size of the second reaction site is greater than a size of the third reaction site.

20 Claims, 11 Drawing Sheets

(58) Field of Classification Search
CPC ..... B01L 2300/0636; B01L 2300/0663; B01L 2300/0819; B01L 2300/0851; B01L 2300/0877; B01L 2300/0896; B01L 2400/0421; B01L 2400/0424; B01L 3/502715; B01L 3/502761
See application file for complete search history.

(56) References Cited

U.S. PATENT DOCUMENTS

| | | | |
|---|---|---|---|
| 2003/0017467 A1 | 1/2003 | Hooper et al. | |
| 2004/0022677 A1* | 2/2004 | Wohlstadter | G01N 21/253 422/52 |
| 2011/0068015 A1 | 3/2011 | Park et al. | |
| 2011/0315229 A1 | 12/2011 | Linder et al. | |
| 2012/0071342 A1 | 3/2012 | Lochhead et al. | |
| 2014/0287423 A1* | 9/2014 | Nurse | B01L 3/5088 435/6.12 |
| 2015/0196912 A1* | 7/2015 | Tsai | B01L 3/502707 156/60 |

FOREIGN PATENT DOCUMENTS

| | | |
|---|---|---|
| CN | 106111220 A | 11/2016 |
| CN | 107008513 A | 8/2017 |
| CN | 107739711 A | 2/2018 |
| CN | 108289914 A | 7/2018 |
| CN | 110573253 A | 12/2019 |
| JP | 2016513468 A | 5/2016 |
| JP | 2020-153862 A | 9/2020 |
| KR | 20200100137 A | 8/2020 |
| TW | 202007971 A | 2/2020 |
| WO | WO2009022496 A1 | 2/2009 |
| WO | WO-2013/063230 A1 | 5/2013 |
| WO | WO2015019520 A1 | 2/2015 |

OTHER PUBLICATIONS

Sara Mahshid et al; "Transverse dielectrophoretic-based DNA nanoscale confinement" Scientific Reports; Apr. 13, 2018; pp. 1-12.
EP Search Report mailed Jul. 5, 2021 in EP Application No. 20217812.5, 13 pages.
Office Action mailed Sep. 5, 2022 issued in corresponding KR Application No. 10-2021-0000487 (with English translation).
Search Report dated Sep. 14, 2022 issued in corresponding CN Application No. 202110711005.5.
Office Action dated on Sep. 21, 2022 issued in corresponding CN Application No. 202110711005.5 (with English translation).
The Office Action of its corresponding JP application No. 2021-053382 issued on Mar. 15, 2022.

* cited by examiner

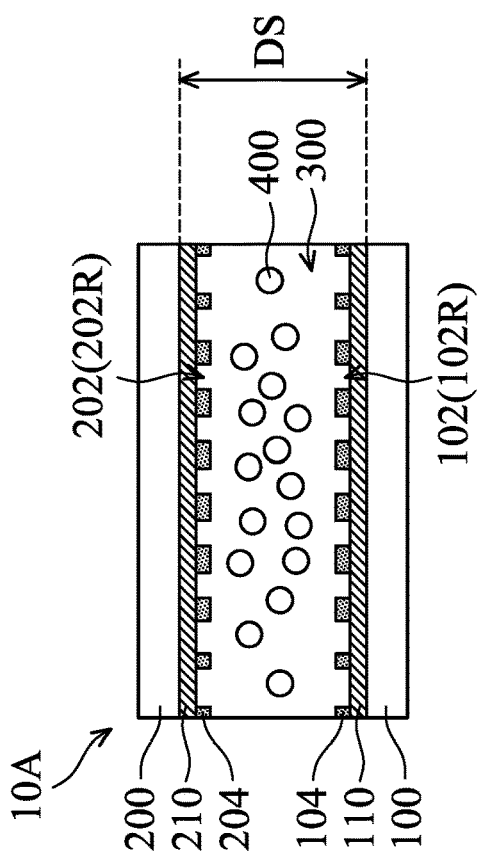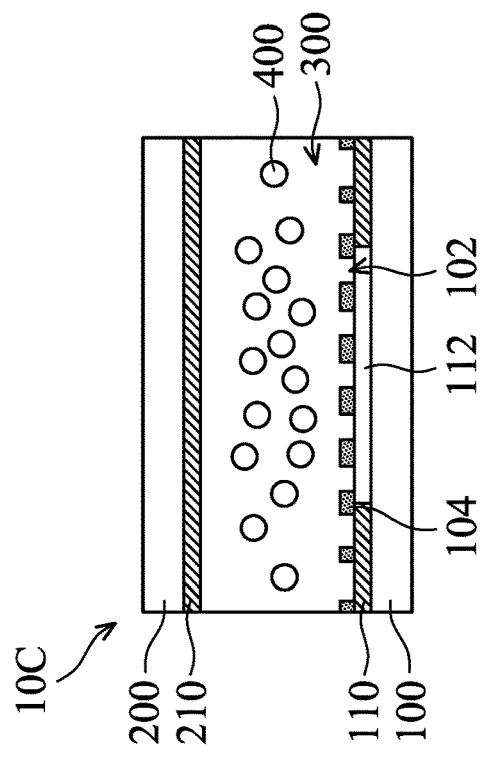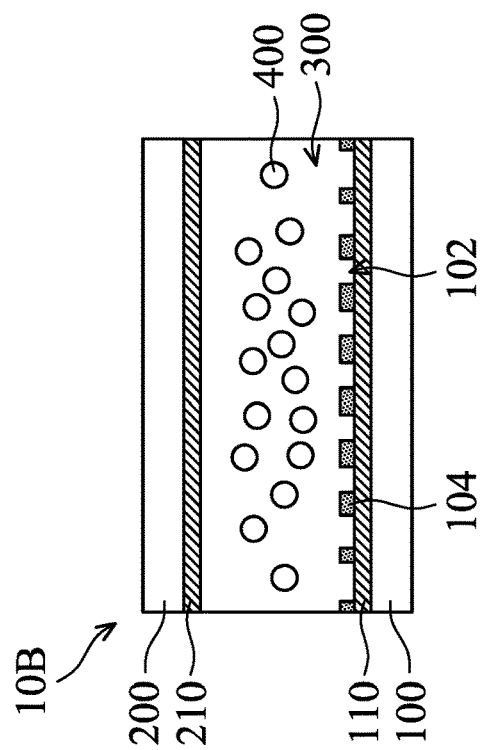

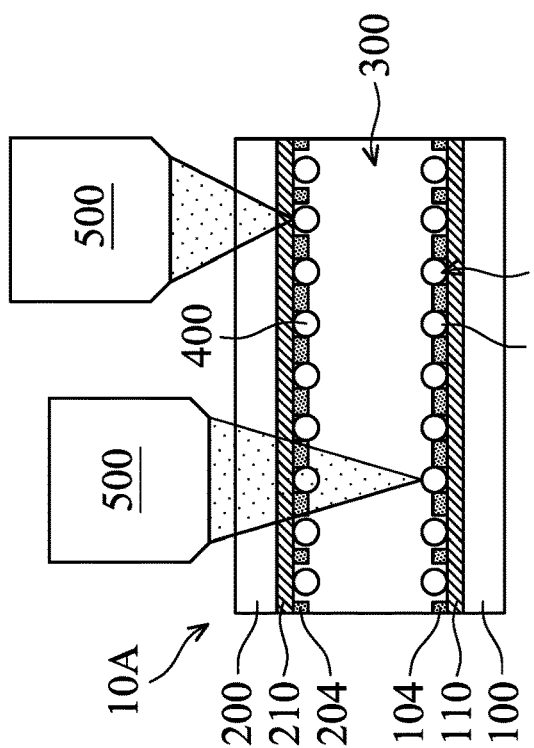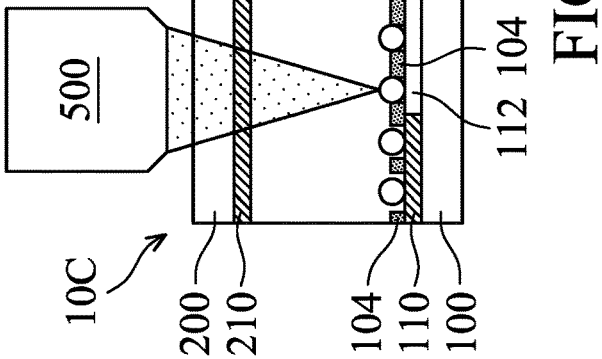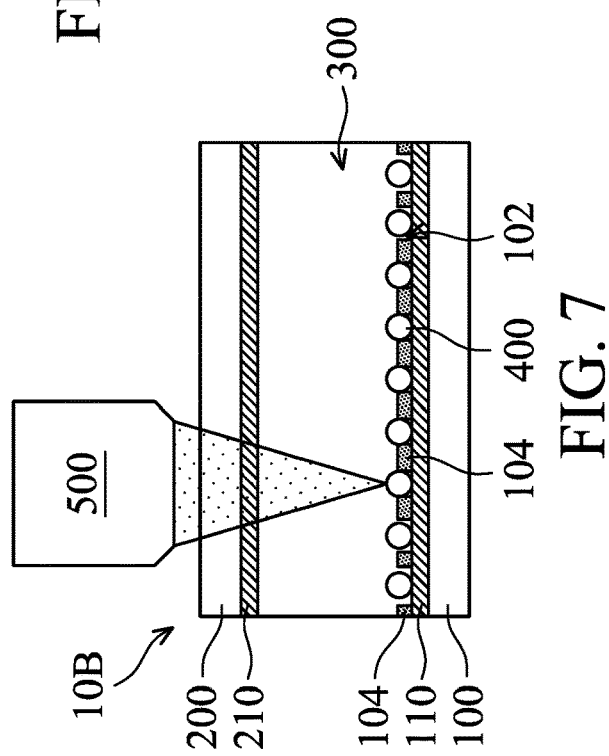

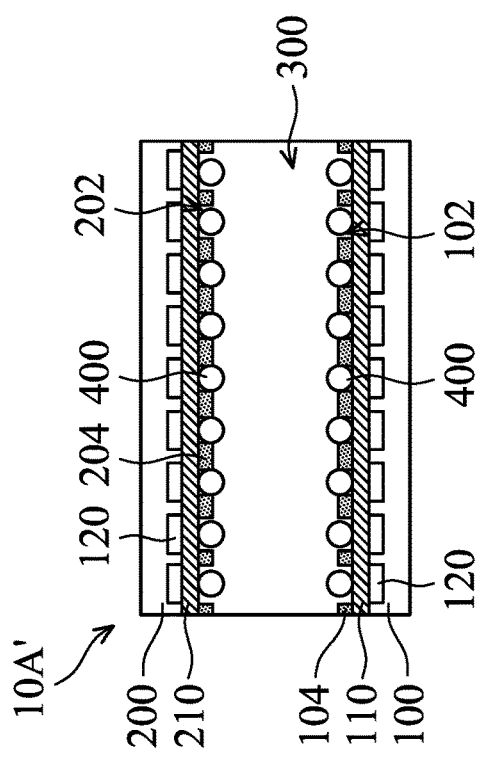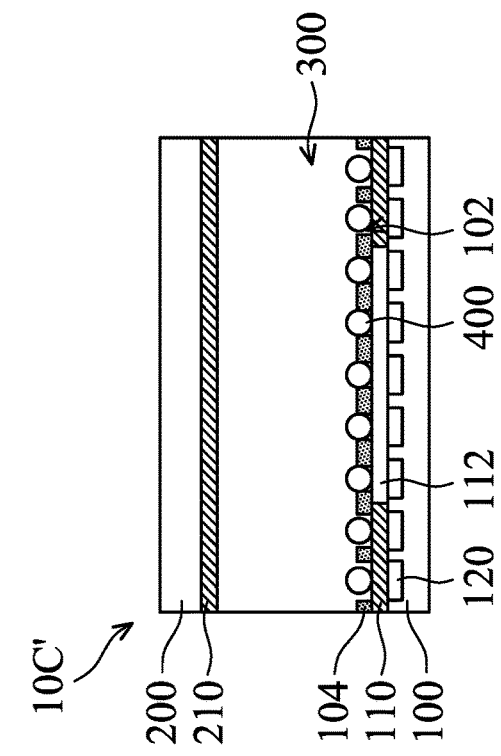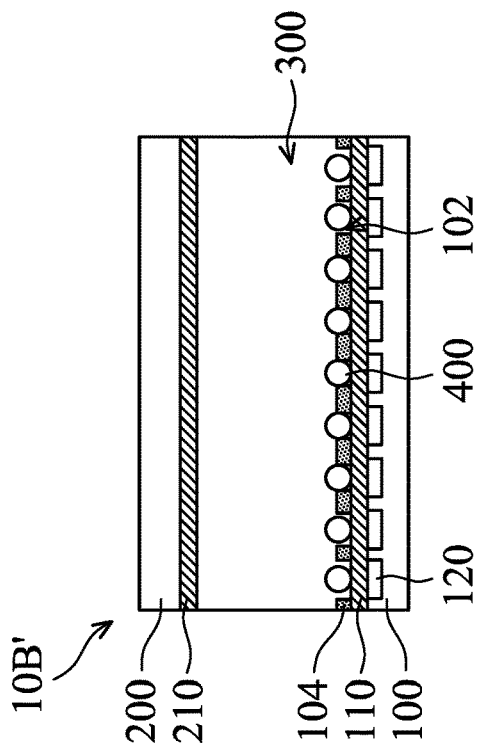

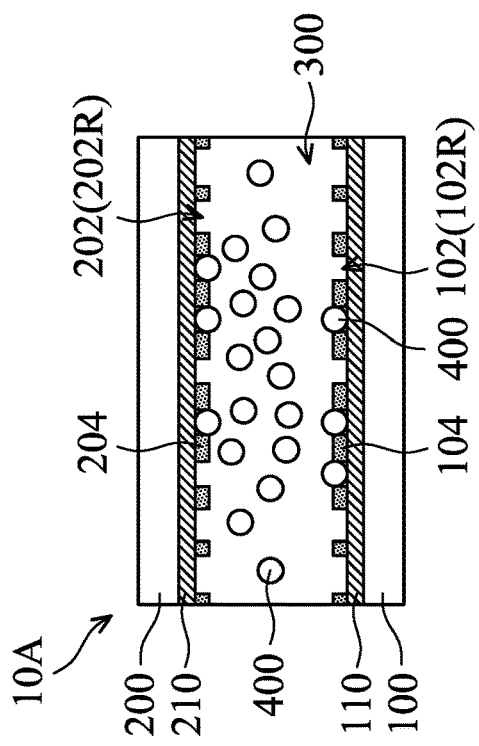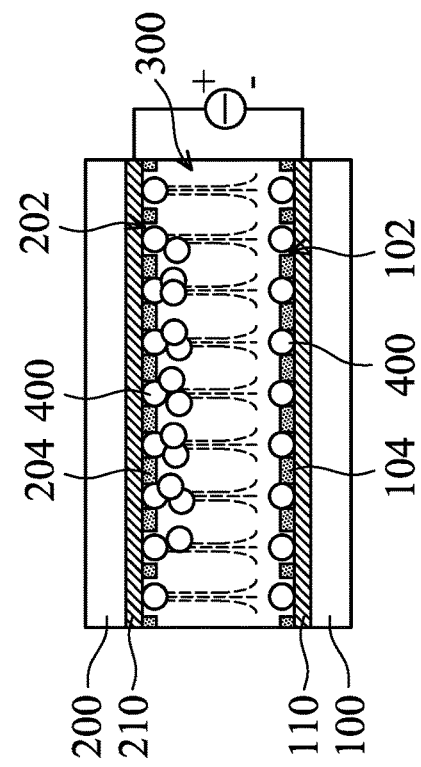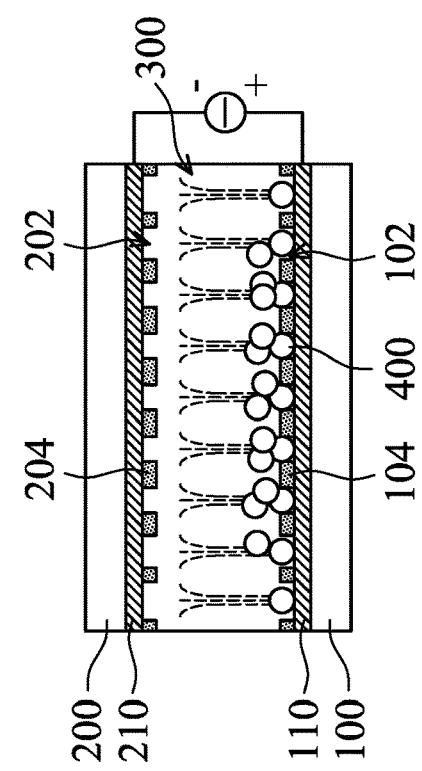
FIG. 12A
FIG. 12B
FIG. 12C

SENSOR DEVICE AND METHOD OF USING THE SAME

BACKGROUND

Technical Field

The present disclosure relates to a sensor device and a method of using the sensor device. The present disclosure in particular relates to a fluidic biochip and a method of using the same.

Description of the Related Art

Measurement reactions using a sophisticated biomolecule identification function such as an antigen-antibody, protein-protein, and protein-DNA, etc., are becoming important techniques in clinical testing and in taking measurements in the field of biochemistry. In addition, the analysis of DNA hybridization, or DNA sequencing is also extensively used in the research field of biochemistry.

Various biochips, such as microfluidic chips, micro-array chips, or lab-on-a-chip, have been developed for biological and chemical analysis. With the flourishing development of sensor devices, people have high expectation regarding the reliability, quality and cost of these biochips.

Although existing biochips have generally been adequate for their intended purposes, they have not been entirely satisfactory in all respects. For example, the fluidic velocity distribution of the sample at different reaction sites is not uniform, e.g., the fluidic velocity at the reaction sites near the center is higher than the fluidic velocity of those near the boundary. Therefore, the overall loading rates of the samples at different reaction sites are not uniform, which may cause inaccuracy of the testing results. Accordingly, there are still some problems with biochips that remain to be solved.

SUMMARY

In accordance with some embodiments of the present disclosure, a sensor device is provided. The sensor device includes a first substrate, a second substrate, a flow channel and a first reaction group. The second substrate is disposed opposite the first substrate. The flow channel is disposed between the first substrate and the second substrate, and the flow channel includes a fluidic boundary. The first reaction group is disposed on the first substrate, and the first reaction group includes a first reaction site, a second reaction site and a third reaction site. The first reaction site is closer to the fluidic boundary than the second reaction site, and a size of the first reaction site is greater than or equal to a size of the second reaction site. The second reaction site is closer to the fluidic boundary than the third reaction site, and the size of the second reaction site is greater than a size of the third reaction site.

In accordance with some embodiments of the present disclosure, a method of using a sensor device is provided. The method includes providing a sensor device. The sensor device includes a first substrate, a second substrate, a flow channel and a first reaction group. The second substrate is disposed opposite the first substrate. The flow channel is disposed between the first substrate and the second substrate, and the flow channel includes a fluidic boundary. The first reaction group is disposed on the first substrate, and the first reaction group includes a first reaction site, a second reaction site and a third reaction site. The first reaction site is closer to the fluidic boundary than the second reaction site, and a size of the first reaction site is greater than or equal to a size of the second reaction site. The second reaction site is closer to the fluidic boundary than the third reaction site, and the size of the second reaction site is greater than a size of the third reaction site. In addition, the method also includes the following steps: loading a solution including the biosample into the flow channel; applying a voltage to the first conductive layer to immobilize the biosample on the first reaction group; turning off the voltage that is applied to the first conductive layer; and washing out excess biosample from the flow channel.

A detailed description is given in the following embodiments with reference to the accompanying drawings.

BRIEF DESCRIPTION OF THE DRAWINGS

The disclosure may be more fully understood by reading the subsequent detailed description and examples with references made to the accompanying drawings, wherein:

FIG. 3 is a cross-sectional diagrams of a sensor device in accordance with some embodiments of the present disclosure;

FIG. 4 is a cross-sectional diagrams of a sensor device in accordance with some embodiments of the present disclosure;

FIG. 5 is a cross-sectional diagrams of a sensor device in accordance with some embodiments of the present disclosure;

FIG. 6 is a cross-sectional diagrams of a sensor device in accordance with some embodiments of the present disclosure;

FIG. 7 is a cross-sectional diagrams of a sensor device in accordance with some embodiments of the present disclosure;

FIG. 8 is a cross-sectional diagrams of a sensor device in accordance with some embodiments of the present disclosure;

FIG. 9 is a cross-sectional diagrams of a sensor device in accordance with some embodiments of the present disclosure;

FIG. 10 is a cross-sectional diagrams of a sensor device in accordance with some embodiments of the present disclosure;

FIG. 11 is a cross-sectional diagrams of a sensor device in accordance with some embodiments of the present disclosure;

FIGS. 12A-12E are cross-sectional diagrams of a sensor device during the intermediate stages of the method of using the sensor device in accordance with some embodiments of the present disclosure;

DETAILED DESCRIPTION

Figure 1A:
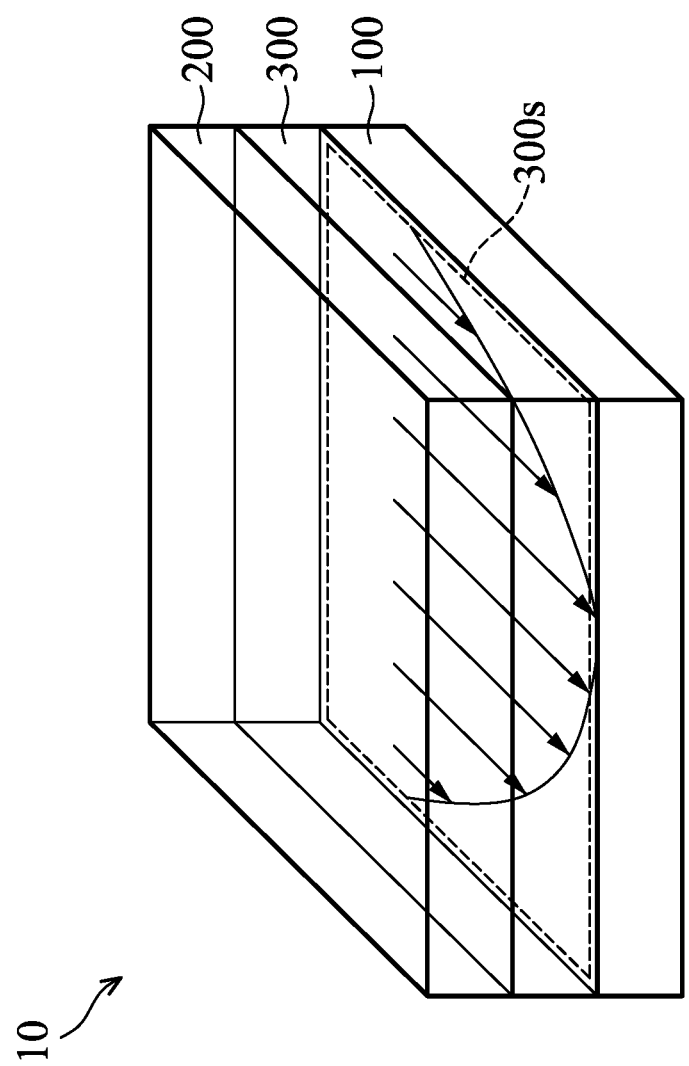
FIG. 1A is a schematic diagram of a sensor device in accordance with some embodiments of the present disclosure.

The sensor device and the method of using the sensor device of the present disclosure are described in detail in the following description. In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the concept of the present disclosure may be embodied in various forms without being limited to those exemplary embodiments.

In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments. It should be understood that this description of the exemplary embodiments is intended to be read in connection with the accompanying drawings, which are to be considered part of the entire written description. The drawings are not drawn to scale. In addition, structures and devices are shown schematically in order to simplify the drawing.

In addition, the expressions "a layer overlying another layer", "a layer is disposed above another layer", "a layer is disposed on another layer" and "a layer is disposed over another layer" may indicate that the layer is in direct contact with the other layer, or that the layer is not in direct contact with the other layer, there being one or more intermediate layers disposed between the layer and the other layer.

In addition, in this specification, relative expressions are used. For example, "lower", "bottom", "higher" or "top" are used to describe the position of one element relative to another. It should be appreciated that if a device is flipped upside down, an element that is "lower" will become an element that is "higher".

It should be understood that, although the terms first, second, third etc. may be used herein to describe various elements, components, regions, layers, portions and/or sections, these elements, components, regions, layers, portions and/or sections should not be limited by these terms. These terms are only used to distinguish one element, component, region, layer, portion or section from another element, component, region, layer or section. Thus, a first element, component, region, layer, portion or section discussed below could be termed a second element, component, region, layer, portion or section without departing from the teachings of the present disclosure.

The terms "about" and "substantially" typically mean +/−10% of the stated value, more typically mean +/−5% of the stated value, more typically +/−3% of the stated value, more typically +/−2% of the stated value, more typically +/−1% of the stated value and even more typically +/−0.5% of the stated value. The stated value of the present disclosure is an approximate value. When there is no specific description, the stated value includes the meaning of "about" or "substantially".

Unless defined otherwise, all technical and scientific terms used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined.

In accordance with some embodiments of the present disclosure, the sensor device may include the reaction group having a larger size of reaction site near the fluidic boundary region than the center region to compensate the low sample loading rate due to the parabolic flow velocity profile in the flow channel. Therefore, the sample loading rate of the reaction sites may be uniform at different positions of the flow channel (e.g., the center region or boundary region) and reliability or performance of the sensor device may be improved. Moreover, in accordance with some embodiments, the sensor device may further include the conductive layers disposed on the substrates so that the dielectrophoretic (DEP) or electrophoretic (EP) force may be generated to assist in attracting the dielectric or charged samples to the reaction sites, respectively. The loading efficiency of the samples may be increased accordingly.

FIG. 1A is a schematic diagram of a sensor device 10 in accordance with some embodiments of the present disclosure. It should be understood that some of the components of the sensor device 10 are omitted in FIG. 1 for clarity. In addition, it should be understood that additional features may be added to the sensor device 10 in accordance with some embodiments of the present disclosure.

In accordance with embodiments of the present disclosure, the sensor device 10 may be not limited to a particular use. In accordance with some embodiments, the sensor device 10 may be used for biological or biochemical analysis. For example, the sensor device 10 may be used to measure or analyze a DNA sequence, DNA-DNA hybridization, single nucleotide polymorphisms, protein interactions, peptide interactions, antigen-antibody interactions, protein microarray, liquid biopsy, quantitative polymerase chain reaction (qPCR), glucose monitoring, cholesterol monitoring, and the like.

The sensor device 10 may include a first substrate 100, a second substrate 200 and a flow channel 300. The second substrate 200 may be disposed opposite the first substrate 100. The flow channel 300 may be disposed between the first substrate 100 and the second substrate 200. In accordance with some embodiments, the first substrate 100 and the second substrate 200 may be spaced apart by a distance, and the flow channel 300 may be the space defined between the first substrate 100 and the second substrate 200.

In accordance with some embodiments, the material of the first substrate 100 and the second substrate 200 may include an organic material, an inorganic material, or a combination thereof. For example, the organic material may include epoxy resins, silicone resins (such as polydimethylsiloxane (PDMS)), acrylic resins (such as polymethylmetacrylate (PMMA)), polyimide (PI), polycarbonate (PC), polyethylene terephthalate (PET), perfluoroalkoxy alkane (PFA), other suitable materials or a combination thereof, but it is not limited thereto. For example, the inorganic material may include glass, ceramic, silicon nitride, silicon oxide, silicon oxynitride, aluminum oxide, other suitable materials or a combination thereof, but it is not limited thereto. In addition, the material of the first substrate 100 may be the same as or different from that of the second substrate 200.

In accordance with some embodiments, the first substrate 100 may be a complementary metal-oxide-semiconductor (CMOS) substrate. For example, the material of the first substrate 100 may include, but is not limited to, silicon, III-V group on silicon, graphene-on-silicon, silicon-on-insulator, or a combination thereof.

Figure 1B:
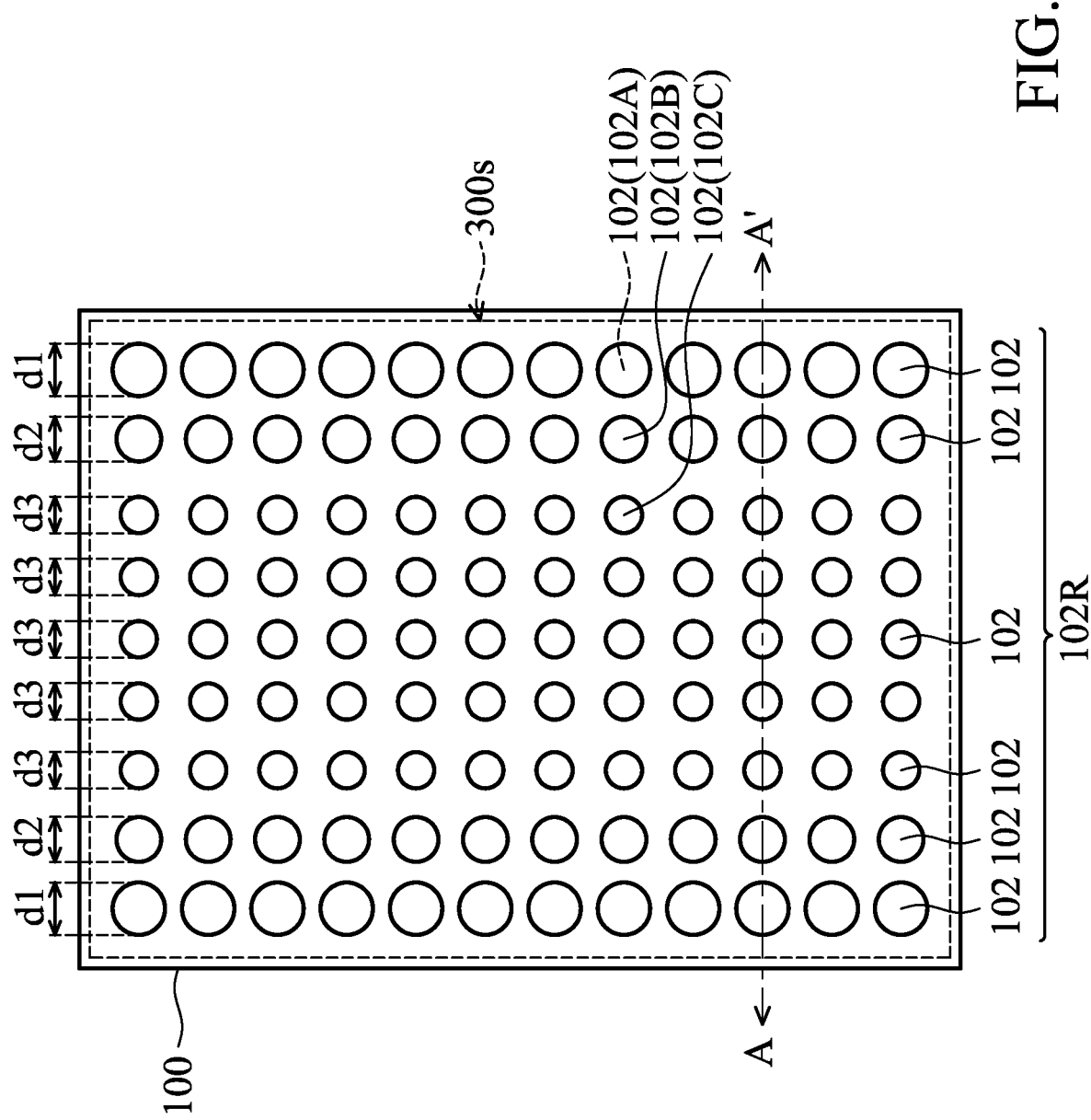
FIG. 1B is a top-view diagram of a sensor device in accordance with some embodiments of the present disclosure.

In accordance with some embodiments, the solution containing the samples to be detected or analyzed may flow through the flow channel 300 and the samples may be positioned on the reaction sites 102 (as shown in FIG. 1B) on the first substrate 100. In addition, the flow channel 300 may include a fluidic boundary 300s (illustrated by the dotted line in the drawing), and the fluidic boundary 300s may be located at the peripheral area of the flow channel 300. In accordance with some embodiments, the fluidic boundary 300s is near to the edge of the flow channel 300. As shown FIG. 1A, the solution flowing in the flow channel 300 may present a parabolic flow velocity profile. In other words, the sample loading rate near the fluidic boundary 300s may be lower than the center region.

In accordance with some embodiments of the present disclosure, the sensor device 10 may include a larger size of reaction site 102 near the fluidic boundary 300s than the center region to compensate the low sample loading rate due to the parabolic flow velocity profile in the flow channel 300. Specifically, refer to FIG. 1B, which is a top-view diagram of the first substrate 100 of the sensor device 10 in accordance with some embodiments of the present disclosure.

The sensor device 10 may include a plurality of first reaction groups 102R. The first reaction group 102R may be disposed on the first substrate 100, and each first reaction group 102R may include a plurality of reaction sites 102. In accordance with some embodiments, the reaction site 102 may be a nanospot or a nanowell. In accordance with some embodiments, the first reaction group 102R includes the reaction sites 102 that are located in the same row, and the row may be substantially perpendicular to an extending direction of the flow channel 300. In accordance with the embodiments of the present disclosure, the "extending direction" of an object refers to a direction along, or substantially parallel to, the long axis of the object. For example, the object can be encircled by a minimum rectangle, and the extending direction of the long side of the minimum rectangle is the direction of the long axis.

For clear explanation, three of the reaction sites 102 are labeled as reaction site 102A, reaction site 102B and reaction site 102C. As shown in FIG. 1B, the reaction site 102A is closer to the fluidic boundary 300s than the reaction site 102B, and the size of the reaction site 102A is greater than or equal to the size of the reaction site 102B. Moreover, the reaction site 102B is closer to the fluidic boundary 300s than the reaction site 102C, and the size of the reaction site 102B is greater than the size of the reaction site 102C.

In accordance with some embodiments, a ratio of the area of the reaction site 102A to the area of the reaction site 102C may be in a range from 1.1:1 to 2:1. In accordance with some embodiments, a ratio of the area of the reaction site 102A to the area of the reaction site 102B may be in a range from 1.1:1 to 1.5:1. In accordance with some embodiments, the area of the reaction site 102 refers to the area of the bottom surface of the reaction site 102.

In other words, the sizes of portions of the reaction sites 102 (e.g., reaction sites 102A and 102B shown in the drawing) may be gradually increased as they are getting closer to the fluidic boundary 300s in accordance with some embodiments. On the other hand, the sizes of portions of the reaction sites 102 (e.g., the reaction sites 102C shown in the drawing) that are farther away from the fluidic boundary 300s may be substantially the same in accordance with some embodiments.

Specifically, in accordance with some embodiments, a diameter d1 of the reaction site 102A is greater than or equal to a diameter d2 of the second reaction site 102B, and the diameter d2 of the reaction site 102B is greater than a diameter d3 of the reaction site 102C. In accordance with some embodiments, a ratio of the diameter d1 of the reaction site 102A to the diameter d3 of the reaction site 102C may be in a range from 1.1:1 to 2:1. In accordance with some embodiments, a ratio of the diameter d1 of the reaction site 102A to the diameter d2 of the reaction site 102B may be in a range from 1.1:1 to 1.5:1.

It should be understood that the quantity of reaction sites 102 is not limited to what is illustrated in the drawings. In accordance with various embodiments, there may be more or fewer reaction sites 102A (e.g., the largest reaction site), reaction sites 102B (e.g., the medium-sized reaction site), and reaction sites 102C (e.g., the smallest reaction site) may be adjusted according to need. In accordance with various embodiments, there may be a different number of sizes of reaction sites 102. For example, there may be more than three sizes of reaction site 102, such as four, five, six, or seven different sizes, but it is not limited thereto. In accordance with various embodiments, the reaction sites 102 may be arranged in a rectangular array or a hexagonal array, but it is not limited thereto.

In addition, the shape of the reaction sites 102 is not limited to circle, as shown in FIG. 1B. In accordance with some other embodiments, the reaction sites 102 may have another suitable shape, for example, elliptical, rectangular, hexagonal, or any other suitable shape. In accordance with some embodiments, there may be more than one possible shape of reaction sites 102.

Figure 1C:
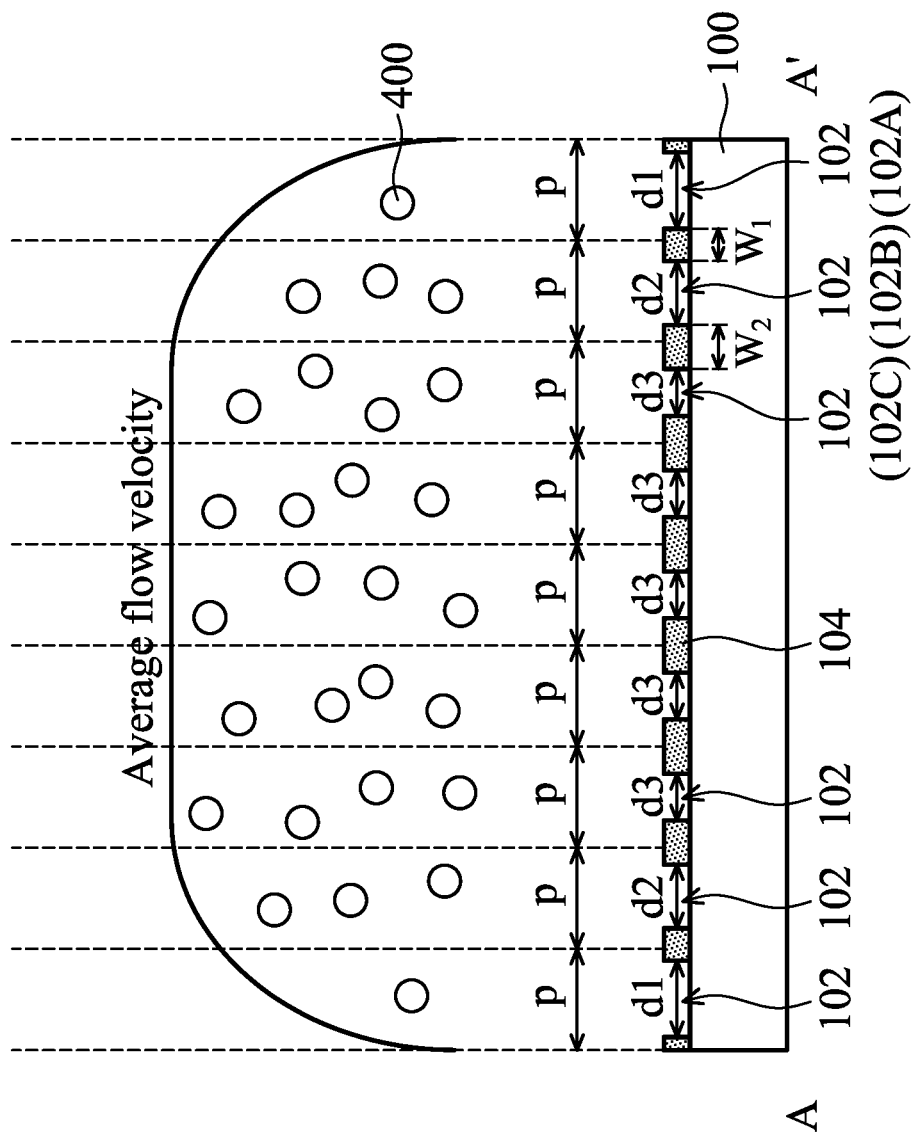
FIG. 1C is a cross-sectional diagram of the sensor device along the section line A-A' in FIG. 1B in accordance with some embodiments of the present disclosure.

Refer to FIG. 1C, which is a cross-sectional diagram of the sensor device 10 along the section line A-A' in FIG. 1B in accordance with some embodiments of the present disclosure. In addition, FIG. 1C also plots the average flow velocity of the solution containing biosamples 400 in the flow channel 300.

As shown in FIG. 1C, in accordance with some embodiments, the sensor device 10 may further include a first spacer layer 104 disposed on the first substrate 100 and between the first substrate 100 and the second substrate 200 (as shown in FIG. 3). In accordance with some embodiments, the first spacer layer 104 may include a plurality of openings and the openings define the reaction sites 102. However, in accordance with some other embodiments, the reaction sites 102 may be the openings formed in the first substrate 100.

In accordance with some embodiments, pitches P of the reaction sites 102 (the reaction sites 102A, 102B and 102C) may be the same. In accordance with some embodiments, a width $W_1$ of the first spacer layer 104 located between the reaction site 102A and the reaction site 102B may be smaller than a width $W_2$ of the first spacer layer 104 located between the reaction site 102B and the reaction site 102C. In accordance with some embodiments, the width W, and the width $W_2$ of the first spacer layer 104 respectively refer to the minimum width of the first spacer layer 104 between the reaction site 102A and the reaction site 102B and the minimum width of the first spacer layer 104 between the reaction site 102B and the reaction site 102C.

In accordance with some embodiments, the material of the first spacer layer 104 may include, but is not limited to, polyethylene terephthalate (PET), polyethylene (PE), polyethersulfone (PES), polycarbonate (PC), polymethylmethacrylate (PMMA), polydimethylsiloxane (PDMS), glass, $SiO_2$, SiON, SiN, $TiO_2$, TiN, $Al_2O_3$, $Ta_2O_5$, $Nb_2O_5$, or a combination thereof.

In accordance with some embodiments, the biosample 400 may include, but is not limited to, DNA, RNA, protein, antigen, antibody, lipid micelle, biomolecule-coated nanoparticles, or a combination thereof. In accordance with some embodiments, the reaction sites 102 of the first reaction group 102R may be modified with a self-assembly monolayer to immobilize the biosample 400 in the solution. In accordance with some embodiments, the sensor device 10 can measure or analyze fluorescence or chemiluminescence emitted by the biosamples 400.

Specifically, in accordance with some embodiments, the reaction sites 102 may be selectively modified with functional groups to capture and immobilize biosamples 400 on the reaction sites 102, and the immobilization mechanism may include surface charge attraction, self-assembled covalent binding, or bio-affinity, but it is not limited thereto. In accordance with some embodiments, when the biosample 400 is negatively charged, the reaction site 102 may be modified to be positively charged. For example, the reaction site 102 may be modified with silane, such as 3-aminopropyltriethoxysilane (APTES) or (3-glycidyloxypropyl)triethoxysilane (GPTES). In accordance with some other embodiments, when the biosample 400 is modified with a biotin tag, the reaction site 102 may be modified with streptavidin.

As describe above, the solution flowing in the flow channel 300 may present a parabolic flow velocity profile, and the average flow velocity or sample loading rate at the reaction site 102A may be lower than that at the reaction site 102B. Similarly, the average flow velocity or sample loading rate at the reaction site 102B may be lower than that at the reaction site 102C. Nevertheless, since the size of the reaction site 102A or the reaction site 102B that is near the fluidic boundary 300s is larger than the size of the reaction site 102C that is farther away from the boundary 300s, the low sample loading rate at the reaction site 102A or the reaction site 102B can be compensated. With such a configuration, the overall loading rate (i.e. loading amount of the biosamples 400) of the reaction sites 102 is substantially uniform in different regions of the flow channel 300.

Figure 2C:
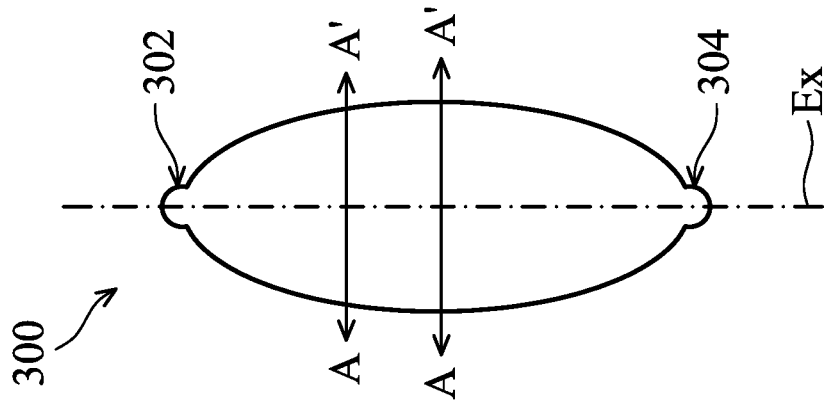
FIGS. 2A-2C are top-view diagrams of a flow channel in accordance with some embodiments of the present disclosure.
Figure 2B:
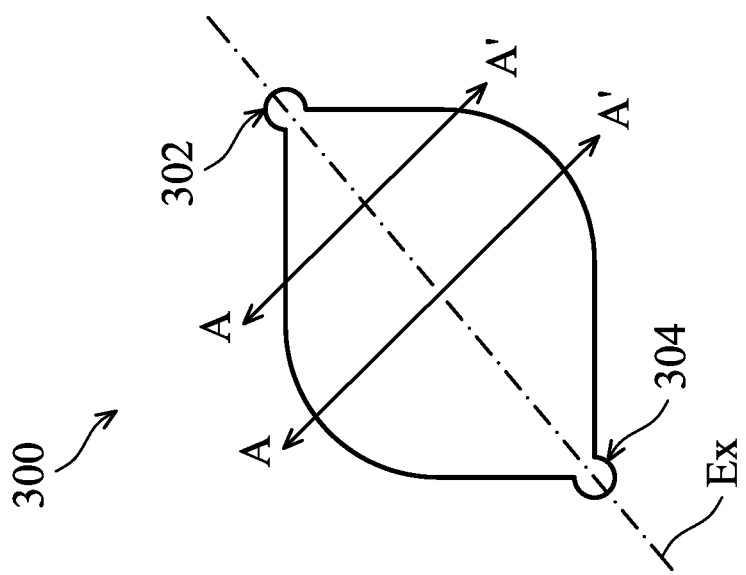
Figure 2A:
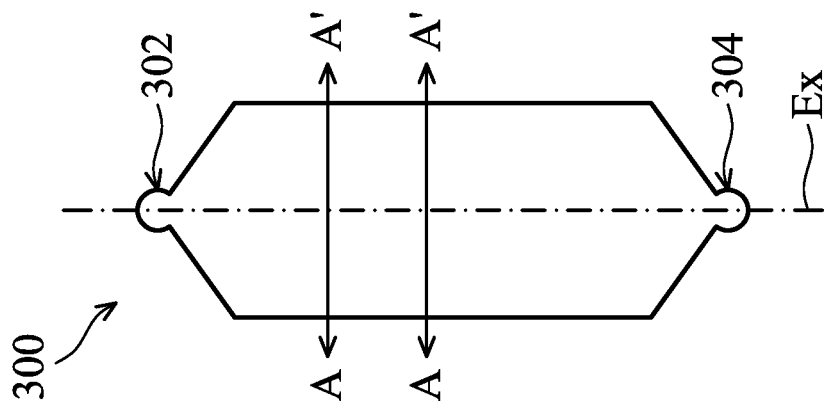

Refer to FIGS. 2A-2C, which are top-view diagrams of the flow channel 300 in accordance with some embodiments of the present disclosure. As shown in FIGS. 2A-2C, the flow channel 300 may include an inlet 302 and an outlet 304. The solution containing the biosmaples 400 may enter the flow channel 300 from the inlet 302 and exit the flow channel 300 from the outlet 304. In accordance with some embodiments, the first reaction group 102R (e.g., including the reaction sites 102A, 102B and 102C as shown in FIG. 1B) may be located on the same cross-sectional line A-A', and the cross-sectional line A-A' may be perpendicular to an extending line Ex of the inlet 302 and the outlet 304. In accordance with some embodiments, the extending line Ex refers to the connection line between the center points of the inlet 302 and the outlet 304. In accordance with some embodiments, the extending line Ex may be substantially parallel to the extending direction of the flow channel 300.

As shown in FIG. 2A, the flow channel 300 may have a hexagonal shape in accordance with some embodiments. As shown in FIG. 2B, the flow channel 300 may have a leaf shape or have curved sides in accordance with some embodiments. As shown in FIG. 2C, the flow channel 300 may have an elliptical shape in accordance with some embodiments. In addition, the inlet 302 and the outlet 304 may be located on two opposite ends of the flow channel 300. It should be noted that the shape of the flow channel 300 is not limited to those described above. In accordance with various embodiments, the flow channel 300 may have any other suitable shape according to need.

Refer to FIG. 3, which is a cross-sectional diagram of a sensor device 10A in accordance with some embodiments of the present disclosure. As shown in FIG. 3, in accordance with some embodiments, the sensor device 10A may further include a first conductive layer 110 and a second conductive layer 210. The first conductive layer 110 may be disposed on the first substrate 100 and between the first substrate 100 and the first spacer layer 104. The second conductive layer 210 may be disposed on the second substrate 200. In accordance with some embodiments, the sensor device 10A may further include a second spacer layer 204 on the second substrate 200 and the second conductive layer 210 may be disposed between the second substrate 200 and the second spacer layer 204.

In accordance with some embodiments, the sensor device 10A may further include a second reaction group 202R disposed on the second substrate 200. The second reaction group 202R may be disposed on the second substrate 200, and each second reaction group 202R may include a plurality of reaction sites 202. The second reaction group 202R may be similar to the first reaction group 102R as described above, and thus will not be repeated herein. In accordance with some embodiments, the biosamples 400 may be positioned on the reaction sites 102 on the first substrate 100 and the reaction sites 202 on the second substrate 200.

In accordance with some embodiments, the first substrate 100 and the second substrate 200 may be spaced a distance DS between the first substrate 100 and the second substrate 200. In accordance with some embodiments, the distance DS may be in a range from 10 µm to 3 mm, or from 25 µm to 1 mm, for example, 50 µm, 100 µm, 250 µm, or 500 µm.

In accordance with some embodiments, the material of the first conductive layer 110 and the second conductive layer 210 may include a metal conductive material, a transparent conductive material, or a combination thereof. The metal conductive material may include copper (Cu), silver (Ag), tin (Sn), aluminum (Al), molybdenum (Mo), tungsten (W), gold (Au), chromium (Cr), nickel (Ni), platinum (Pt), titanium (Ti), copper alloy, silver alloy, tin alloy, aluminum alloy, molybdenum alloy, tungsten alloy, gold alloy, chromium alloy, nickel alloy, platinum alloy, titanium alloy, other suitable conductive materials or a combination thereof, but it is not limited thereto. The transparent conductive material may include a transparent conductive oxide (TCO). For example, the transparent conductive oxide may include indium tin oxide (ITO), tin oxide (SnO), zinc oxide (ZnO), indium zinc oxide (IZO), indium gallium zinc oxide (IGZO), indium tin zinc oxide (ITZO), antimony tin oxide (ATO), antimony zinc oxide (AZO) or a combination thereof, but it is not limited thereto.

In accordance with some embodiments, the first conducive layer 110 disposed under the reaction sites 102 and the second conductive layer 210 disposed under the reaction sites 202 may further provide an active force (e.g., dielectrophoretic or electrophoretic force) to attract biosamples 400 to the surfaces of the reaction sites 102 and the reaction sites 202. Therefore, the loading efficiency of the biosamples 400 may be improved.

Refer to FIG. 4, which is a cross-sectional diagram of a sensor device 10B in accordance with some other embodiments of the present disclosure. It should be understood that the same or similar components or elements in the context of the descriptions provided above and below are represented by the same or similar reference numerals. The materials, manufacturing methods and functions of these components or elements are the same as or similar to those described above, and thus will not be repeated herein.

As shown in FIG. 4, in accordance with some embodiments, the sensor device 10B may include only one spacer layer. For example, in accordance with some embodiments, the sensor device 10B includes the first spacer layer 104 on the first conductive layer 110 but does not include the second spacer layer 204 on the second conductive layer 210. In other words, the sensor device 10B includes the reaction sites 102 on only one side of the substrate (i.e. the first substrate 100).

Refer to FIG. 5, which is a cross-sectional diagram of a sensor device 10C in accordance with some other embodiments of the present disclosure. As shown in FIG. 5, in accordance with some embodiments, the sensor device 10C may include a dielectric layer 112 disposed on the first substrate 100 and between the first substrate 100 and the first spacer layer 104.

In accordance with some embodiments, the dielectric layer 112 may partially overlap the first reaction group 102R. In other words, the dielectric layer 112 may overlap with a portion of the reaction sites 102 but not overlap with another portion of the reaction sites 102. In accordance with some embodiments, the dielectric layer 112 may separate the first conductive layer 110 apart, and the dielectric layer 112 may be interposed between the separated portions of the first conductive layer 110. In accordance with some embodiments, the dielectric layer 112 may be located near the center region of the flow channel 300 and away from the fluidic boundary 300s.

In accordance with some embodiments, the material of the dielectric layer 112 may include, but is not limited to, silicon nitride, silicon oxide, silicon oxynitride, aluminum oxide, niobium oxide, tantalum oxide, titanium oxide, titanium nitride, photoresist, polydimethylsiloxane (PDMS), polymethylmetacrylate (PMMA), polyimide (PI), other suitable materials or a combination thereof.

Refer to FIGS. 6-8, which are cross-sectional diagrams of the sensor device in accordance with some embodiments of the present disclosure. In accordance with some embodiments, the first substrate 100 may be opaque, transparent, or semi-transparent, and the second substrate 200 may be transparent, or semi-transparent. In accordance with some embodiments, the second substrate 200 may refer to an upper substrate of the sensor device. In accordance with some embodiments, the material of the upper substrate (e.g., the second substrate 200) should be transparent or semi-transparent so that light can transmit through the upper substrate and an optical microscope 500 may be used to observe the biosample 400.

As shown in FIG. 6, in accordance with some embodiments, an optical microscope 500 may be used to observe the biosample 400 at the reaction site 102 on the first substrate 100 and the biosample 400 at the reaction site 202 on the second substrate 200. In accordance with some embodiments, the observation of the biosmaples 400 on the first substrate 100 and the second substrate 200 may be performed simultaneously. As shown in FIG. 7 and FIG. 8, in accordance with some embodiments, the sensor device includes the reaction sites 102 only on the first substrate 100, and the optical microscope 500 may be used to observe the biosample 400 at the reaction site 102 on the first substrate 100.

Refer to FIGS. 9-11, which are cross-sectional diagrams of the sensor device in accordance with some embodiments of the present disclosure. In accordance with some embodiments, the first substrate 100 and/or the second substrate 200 may be the complementary metal-oxide-semiconductor (CMOS) substrate. In such embodiments, the first substrate 100 and/or the second substrate 200 may be opaque. In addition, as shown in FIGS. 9-11, the sensor device may further include a plurality of sensor elements 120, and the sensor elements 120 may be disposed within the first substrate 100 and/or the second substrate 200.

In some embodiments, the sensor element 120 may be a photodiode, or another suitable light sensing component that can convert measured light into current. Specifically, in accordance with some embodiments, the sensor element 120 may include a source and a drain of a metal-oxide-semiconductor (MOS) transistor (not illustrated) that may transfer the current to another component, such as another MOS transistor. The another component may include, but is not limited to, a reset transistor, a current source follower or a row selector for transforming the current into digital signals.

As shown in FIG. 9, in accordance with some embodiments, in the sensor device 10A', both the first substrate 100 and the second substrate 200 are CMOS substrates. The sensor elements 120 may be disposed within the first substrate 100 and the second substrate 200 and electrically connected to the first conductive layer 110 and the second conductive layer 210 respectively.

As shown in FIG. 10, in accordance with some embodiments, in the sensor device 10B', the first substrate 100 is a CMOS substrate while the second substrate 200 is not. In accordance with some embodiments, the sensor elements 120 may be in contact with the first conductive layer 110. As shown in FIG. 11, in accordance with some embodiments, in the sensor device 10C', the first substrate 100 is a CMOS substrate while the second substrate 200 is not. In accordance with some embodiments, the sensor elements 120 may be in contact with the first conductive layer 110 and the dielectric layer 112.

Refer to FIGS. 12A-12E, which are cross-sectional diagrams of the sensor device 10A during the intermediate stages of the method of using the sensor device 10A in accordance with some embodiments of the present disclosure. It should be understood that additional operations may be provided before, during, and/or after the method of using the sensor device 10A. In accordance with some embodiments, some of the operations described below may be replaced or eliminated.

As shown in FIG. 12A, the method may include providing the sensor device 10A as described above, and loading a solution containing the biosamples 400 into the flow channel 300. In accordance with some embodiments, after loading the solution containing the biosamples 400 into the flow channel 300, the flow may be stopped and some of the biosamples 400 may be immobilized on the reaction sites 102 and the reaction sites 202.

Next, referring to FIG. 12B, the method may include applying a voltage to the first conductive layer 110 to immobilize the biosample 400 on the reaction sites 102 of the first reaction group 102R. In accordance with some embodiments, the voltage may be a direct current (DC) voltage and the biosamples 400 may be immobilized on the reaction sites 102 by the electrophoresis force. As shown in FIG. 12B, at this stage, the first conductive layer 110 may be positively charged so that the negatively charged biosamples 400 may be attracted to the reaction sites 102. In addition, the method may include turning off the voltage that is applied to the first conductive layer 110.

Next, referring to FIG. 12C, after the step of applying the voltage to the first conductive layer 110 to immobilize the biosamples 400 on the first reaction group 102R, the method may further include reversing the direction of the voltage to immobilize the biosamples 400 on the reaction sites 202 of the second reaction group 202R. As shown in FIG. 12C, at this stage, the second conductive layer 210 may be positively charged so that the negatively charged biosamples 400 may be attracted to the reaction sites 202. It is noted that since the biosamples 400 on the reaction sites 102 have been cross-linked to the surface of the reaction sites 102 via interaction of functional groups, the biosamples 400 that have been immobilized on the reaction sites 102 would not be attracted to the reaction sites 202.

In addition, in accordance with some embodiments, after the step of applying the voltage to the first conductive layer 110 to immobilize the biosamples 400 on the first reaction group 102R, the method may further include waiting for a time period allowing the immobilization stable. In accordance with some embodiments, the time period may be in a range from 5 seconds to 5 hours, or from 10 seconds to 3 hours, or from 30 seconds to 1 hour, for example, 1 minute, 3 minutes, 5 minutes, 10 minutes, or 30 minutes.

Figure 12E:
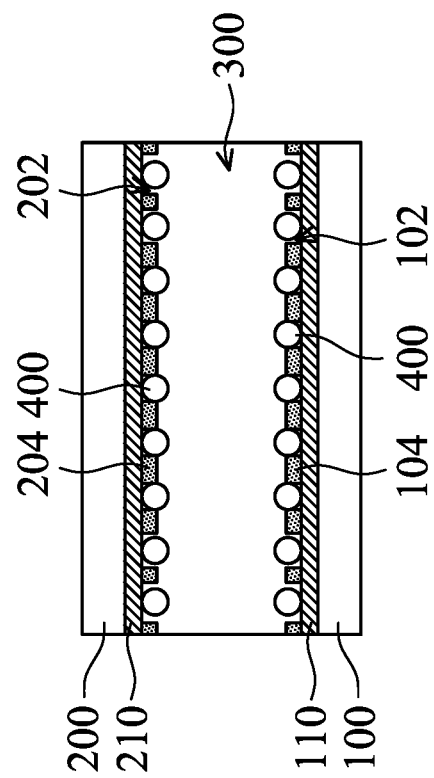
Figure 12D:
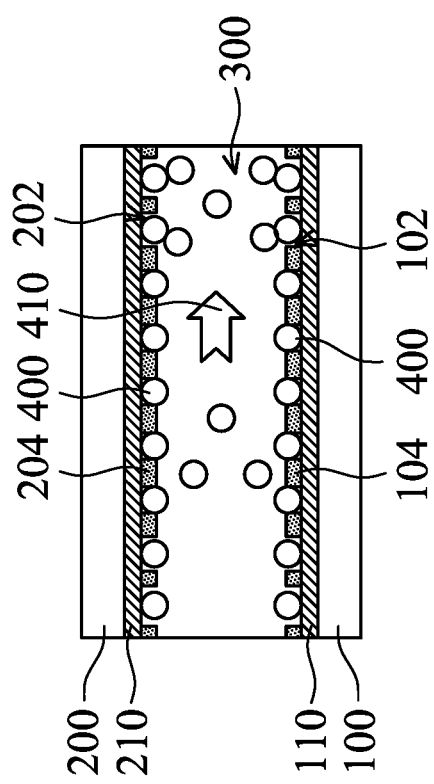

Next, referring to FIG. 12D, the method may include washing out the excess biosamples 400 from the flow channel 300. In accordance with some embodiments, a buffer solution 410 may be used to washing out the excess biosamples 400 and then refill the flow channel 300. In accordance with some embodiments, the buffer solution 410 may be the same type of solution as the solution that contains the biosamples 400. In accordance with some embodiments, the buffer solution 410 may include, but is not limited to, phosphate-buffered saline (PBS) or Tris-EDTA (TE) buffer.

Thereafter, as shown in FIG. 12E, the biosamples 400 may be immobilized on each reaction sites 102 on the first substrate 100 and each reaction sites 202 on the second substrate 200. The biosamples 400 may be fully loaded on the reaction sites of the sensor device 10A.

It should be noted that, in accordance with the embodiments shown in FIGS. 12A-12E, since the first conductive layer 110 and the second conductive layer 210 are symmetric, i.e. the patterns of the first conductive layer 110 and the second conductive layer 210 that are exposed are the same, the biosamples 400 should be negatively charged or positively charged so that they can be attracted to the reaction sites 102 and 202 by the electrophoresis force.

Refer to FIGS. 13A-13D, which are cross-sectional diagrams of the sensor device 10B during the intermediate stages of the method of using the sensor device 10B in accordance with some embodiments of the present disclosure. It should be understood that additional operations may be provided before, during, and/or after the method of using the sensor device 10B. In accordance with some embodiments, some of the operations described below may be replaced or eliminated.

Figure 13B:
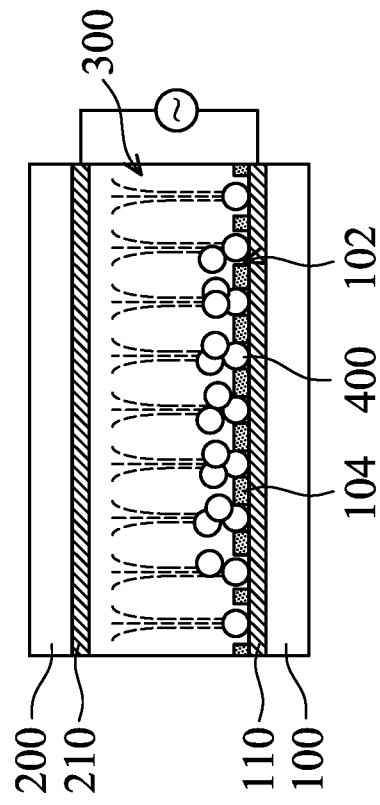
FIGS. 13A-13D are cross-sectional diagrams of a sensor device during the intermediate stages of the method of using the sensor device in accordance with some embodiments of the present disclosure.
Figure 13D:
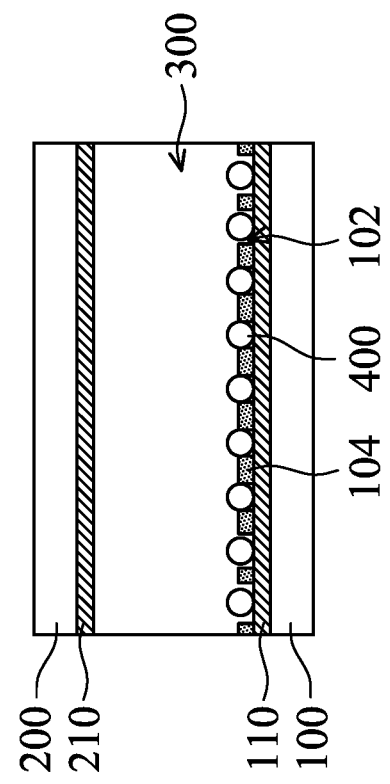
Figure 13A:
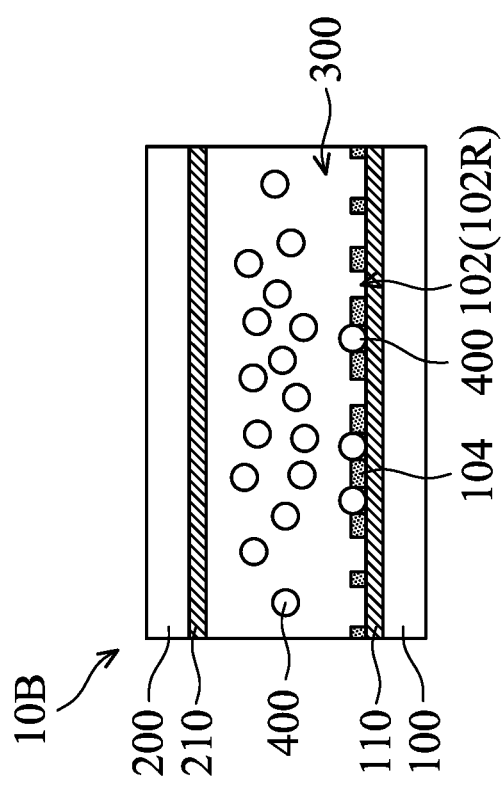

As shown in FIG. 13A, the method may include providing the sensor device 10B as described above, and loading a solution containing the biosamples 400 into the flow channel 300. In accordance with some embodiments, after loading the solution containing the biosamples 400 into the flow channel 300, the flow may be stopped and some of the biosamples 400 may be immobilized on the reaction sites 102.

Next, referring to FIG. 13B, the method may include applying a voltage to the first conductive layer 110 to immobilize the biosample 400 on the reaction sites 102 of the first reaction group 102R. In accordance with some embodiments, the voltage may be an alternating current (AC) voltage and the biosamples 400 may be immobilized on the reaction sites 102 of the first reaction group 102R by a dielectrophoresis force. In accordance with some embodiments, a frequency of the alternating current voltage may be in a range from 1 KHz to 1 GHz, for example, 1 MHz. In addition, the method may include turning off the voltage that is applied to the first conductive layer 110.

In addition, in accordance with some embodiments, after the step of applying the voltage to the first conductive layer 110 to immobilize the biosamples 400 on the first reaction group 102R, the method may further include waiting for a time period allowing the immobilization stable. In accordance with some embodiments, the time period may be in a range from 5 seconds to 5 hours, or from 10 seconds to 3 hours, or from 30 seconds to 1 hour, for example, 1 minute, 3 minutes, 5 minutes, 10 minutes, or 30 minutes.

Figure 13C:
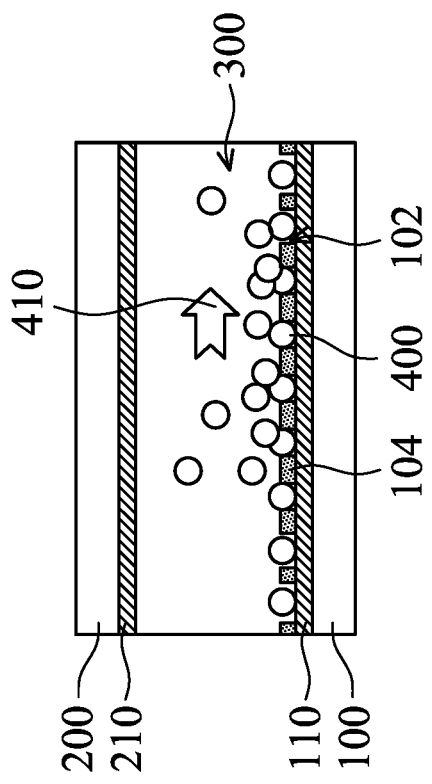

Next, referring to FIG. 13C, the method may include washing out the excess biosamples 400 from the flow channel 300. In accordance with some embodiments, the buffer solution 410 may be used to washing out the excess biosamples 400 and then refill the flow channel 300. Thereafter, as shown in FIG. 13D, the biosamples 400 may be immobilized on each reaction sites 102 on the first substrate 100. The biosamples 400 may be fully loaded on the reaction sites of the sensor device 10B.

It should be noted that, in accordance with the embodiments shown in FIGS. 13A-13D, since the first conductive layer 110 and the second conductive layer 210 are asymmetric, i.e. the patterns of the first conductive layer 110 and the second conductive layer 210 that are exposed are different, the biosamples 400 can be uncharged, negatively charged or positively charged and all of them can be attracted to the reaction sites 102 by the dielectrophoresis force.

Refer to FIGS. 14A-14D, which are cross-sectional diagrams of the sensor device 10C during the intermediate stages of the method of using the sensor device 10C in accordance with some embodiments of the present disclosure. It should be understood that additional operations may be provided before, during, and/or after the method of using the sensor device 10C. In accordance with some embodiments, some of the operations described below may be replaced or eliminated.

Figure 14A:
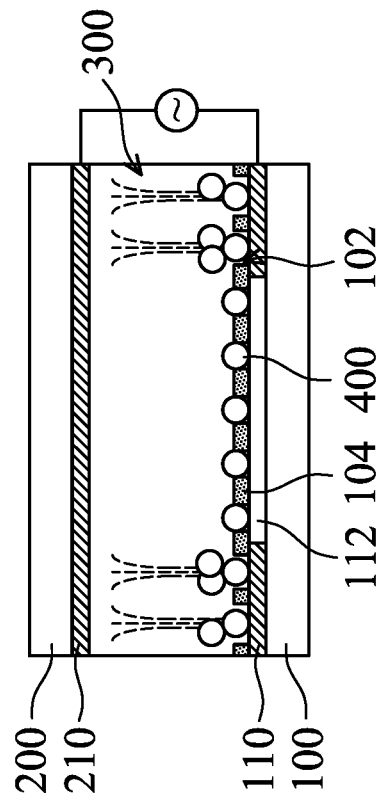
FIGS. 14A-14D are cross-sectional diagrams of a sensor device during the intermediate stages of the method of using the sensor device in accordance with some embodiments of the present disclosure.

As shown in FIG. 14A, the method may include providing the sensor device 10C as described above, and loading a solution containing the biosamples 400 into the flow channel 300. In accordance with some embodiments, after loading the solution containing the biosamples 400 into the flow channel 300, the flow may be stopped and some of the biosamples 400 may be immobilized on the reaction sites 102 by a proper resting time. The device 10C includes a dielectric layer 112 under the reaction sites 102C where the average flow velocity is relatively high and uniform, and therefore, the additional electrical attraction force may not be needed.

Figure 14B:
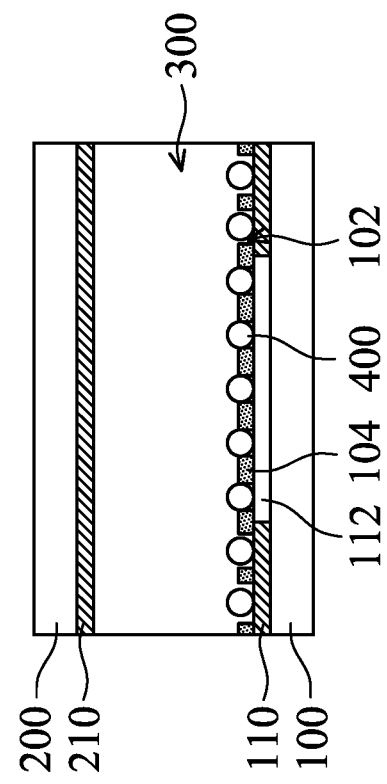

Next, referring to FIG. 14B, the method may include applying a voltage to the first conductive layer 110 to immobilize the biosample 400 on the reaction sites 102A and 102B of the first reaction group 102R. In accordance with some embodiments, the voltage may be an alternating current (AC) voltage and the biosamples 400 may be immobilized on the reaction sites 102A and 102B of the first reaction group 102R by a dielectrophoresis force. In accordance with some embodiments, a frequency of the alternating current voltage may be in a range from 1 KHz to 1 GHz, for example, 1 MHz. In addition, the method may include turning off the voltage that is applied to the first conductive layer 110.

In addition, in accordance with some embodiments, after the step of applying the voltage to the first conductive layer 110 to immobilize the biosamples 400 on the first reaction group 102R, the method may further include waiting for a time period allowing the immobilization stable. In accordance with some embodiments, the time period may be in a range from 5 seconds to 5 hours, or from 10 seconds to 3 hours, or from 30 seconds to 1 hour, for example, 1 minute, 3 minutes, 5 minutes, 10 minutes, or 30 minutes.

Figure 14C:
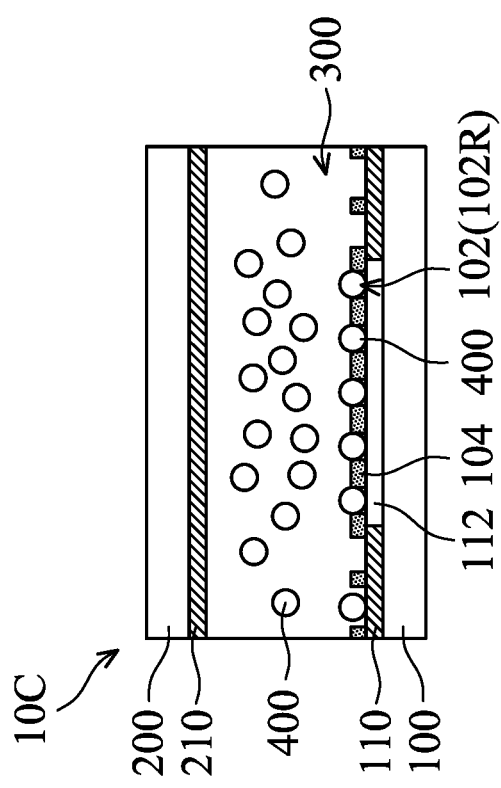
Figure 14D:
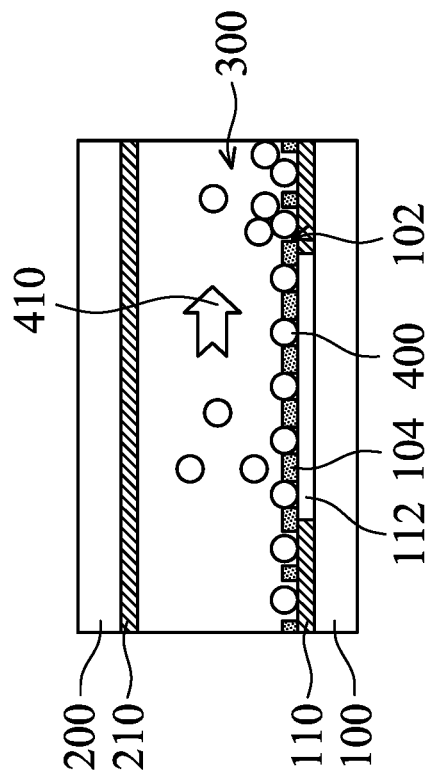

Next, referring to FIG. 14C, the method may include washing out the excess biosamples 400 from the flow channel 300. In accordance with some embodiments, the buffer solution 410 may be used to washing out the excess biosamples 400 and then refill the flow channel 300. Thereafter, as shown in FIG. 14D, the biosamples 400 may be immobilized on each reaction sites 102 on the first substrate 100 and some of the biosamples 400 may be located on the dielectric layer 112. The biosamples 400 may be fully loaded on the reaction sites of the sensor device 10C.

It should be noted that, in accordance with the embodiments shown in FIGS. 14A-14D, since the first conductive layer 110 and the second conductive layer 210 are asymmetric, i.e. the patterns of the first conductive layer 110 and the second conductive layer 210 that are exposed are different, the biosamples 400 can be uncharged, negatively charged or positively charged and all of them can be attracted to the reaction sites 102 by the dielectrophoresis force.

To summarize the above, in accordance with some embodiments, the sensor device may include the reaction group having a larger size of reaction site near the fluidic boundary region than the center region to compensate the low sample loading rate due to the parabolic flow velocity profile in the flow channel. Therefore, the sample loading rate of the reaction sites may be uniform at different positions of the flow channel (e.g., the center region or boundary region) and reliability or performance of the sensor device may be improved. Moreover, in accordance with some embodiments, the sensor device may further include the conductive layers disposed on the substrates so that the dielectrophoretic force may be generated to assist in attracting the charged samples to the reaction sites. The loading efficiency of the samples may be increased accordingly.

Although some embodiments of the present disclosure and their advantages have been described in detail, it should be understood that various changes, substitutions and alterations can be made herein without departing from the spirit and scope of the disclosure as defined by the appended claims. For example, it will be readily understood by one of ordinary skill in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A sensor device, comprising:
    a first substrate;
    a second substrate disposed opposite the first substrate;
    a flow channel disposed between the first substrate and the second substrate, the flow channel comprising a fluidic boundary; and
    a first reaction group disposed on the first substrate, the first reaction group comprising a first reaction site, a second reaction site and a third reaction site,
    wherein the first reaction site is closer to the fluidic boundary than the second reaction site, and a size of the first reaction site is greater than or equal to a size of the second reaction site,
    and wherein the second reaction site is closer to the fluidic boundary than the third reaction site, and the size of the second reaction site is greater than a size of the third reaction site, wherein in a top view the flow channel comprises an inlet and an outlet, the first reaction site and the second reaction site are on a cross-sectional line, and the cross-sectional line is perpendicular to an extending line of the inlet and the outlet.

2. The sensor device as claimed in claim 1, wherein a diameter of the first reaction site is greater than or equal to a diameter of the second reaction site, and the diameter of the second reaction site is greater than a diameter of the third reaction site.

3. The sensor device as claimed in claim 2, wherein a ratio of the diameter of the first reaction site to the diameter of the third reaction site is in a range from 1.1:1 to 2:1, and a ratio of the diameter of the first reaction site to the diameter of the second reaction site is in a range from 1.1:1 to 1.5:1.

4. The sensor device as claimed in claim 1, wherein pitches of the first reaction site, the second reaction site and the third reaction site are the same.

5. The sensor device as claimed in claim 1, further comprising a spacer layer disposed between the first substrate and the second substrate.

6. The sensor device as claimed in claim 5, further comprising:
    a first conductive layer disposed between the first substrate and the spacer layer; and
    a second conductive layer disposed on the second substrate.

7. The sensor device as claimed in claim 5, further comprising a dielectric layer disposed on the first substrate and between the first substrate and the spacer layer, wherein the dielectric layer partially overlaps the first reaction group.

8. The sensor device as claimed in claim 1, wherein the first substrate is opaque, transparent, or semi-transparent, and the second substrate is transparent, or semi-transparent.

9. The sensor device as claimed in claim 1, wherein the first substrate is a complementary metal-oxide-semiconductor (CMOS) substrate.

10. The sensor device as claimed in claim 1, wherein the first reaction group is modified with a self-assembly monolayer to immobilize a biosample in a solution.

11. The sensor device as claimed in claim 1, further comprising a second reaction group disposed on the second substrate.

12. The sensor device as claimed in claim 1, wherein the first reaction site and the second reaction site are symmetrically disposed on opposite sides of the third reaction site in the cross-sectional line, respectively.

13. A method of using a sensor device, comprising:
providing a sensor device, comprising:
a first substrate;
a second substrate disposed opposite the first substrate;
a flow channel disposed between the first substrate and the second substrate, the flow channel comprising a fluidic boundary;
a first conductive layer disposed on the first substrate;
a second conductive layer disposed on the second substrate;
a first reaction group disposed on the first substrate, the first reaction group comprising a first reaction site, a second reaction site and a third reaction site, wherein the first reaction site is closer to the fluidic boundary than the second reaction site, and a size of the first reaction site is greater than or equal to a size of the second reaction site, and wherein the second reaction site is closer to the fluidic boundary than the third reaction site, and the size of the second reaction site is greater than a size of the third reaction site;
wherein in a top view the flow channel comprises an inlet and an outlet, the first reaction site and the second reaction site are on a cross-sectional line, and the cross-sectional line is perpendicular to an extending line of the inlet and the outlet;
loading a solution comprising the biosample into the flow channel;
applying a voltage to the first conductive layer to immobilize the biosample on the first reaction group;
turning off the voltage that is applied to the first conductive layer; and
washing out excess biosample from the flow channel.

14. The method of using the sensor device as claimed in claim 13, wherein the voltage is a direct current (DC) voltage and the biosample is immobilized on the first reaction group by an electrophoresis force.

15. The method of using the sensor device as claimed in claim 13, wherein the voltage is an alternating current (AC) voltage and the biosample is immobilized on the first reaction group by a dielectrophoresis force, and a frequency of the alternating current voltage is in a range from 1 KHz to 1 GHz.

16. The method of using the sensor device as claimed in claim 13, wherein the sensor device further comprises a spacer layer disposed between the first substrate and the second substrate.

17. The method of using the sensor device as claimed in claim 13, wherein the sensor device further comprises a dielectric layer disposed on the first substrate and separating the first conductive layer apart, wherein the dielectric layer partially overlaps the first reaction group.

18. The method of using the sensor device as claimed in claim 13, wherein the sensor device further comprises a second reaction group disposed on the second substrate.

19. The method of using the sensor device as claimed in claim 13, after the step of applying the voltage to the first conductive layer to immobilize the biosample on the first reaction group, further comprising reversing direction of the voltage to immobilize the biosample on the second reaction group.

20. The method of using the sensor device as claimed in claim 13, after the step of applying the voltage to the first conductive layer to immobilize the biosample on the first reaction group, further comprising waiting for a time period, wherein the time period is in a range from 5 seconds to 5 hours.

\* \* \* \* \*